June 26, 1945. A. B. MacNEILL 2,379,242
HIGH SPEED ROTARY CUTTING MACHINE
Filed Dec. 17, 1942 6 Sheets-Sheet 1
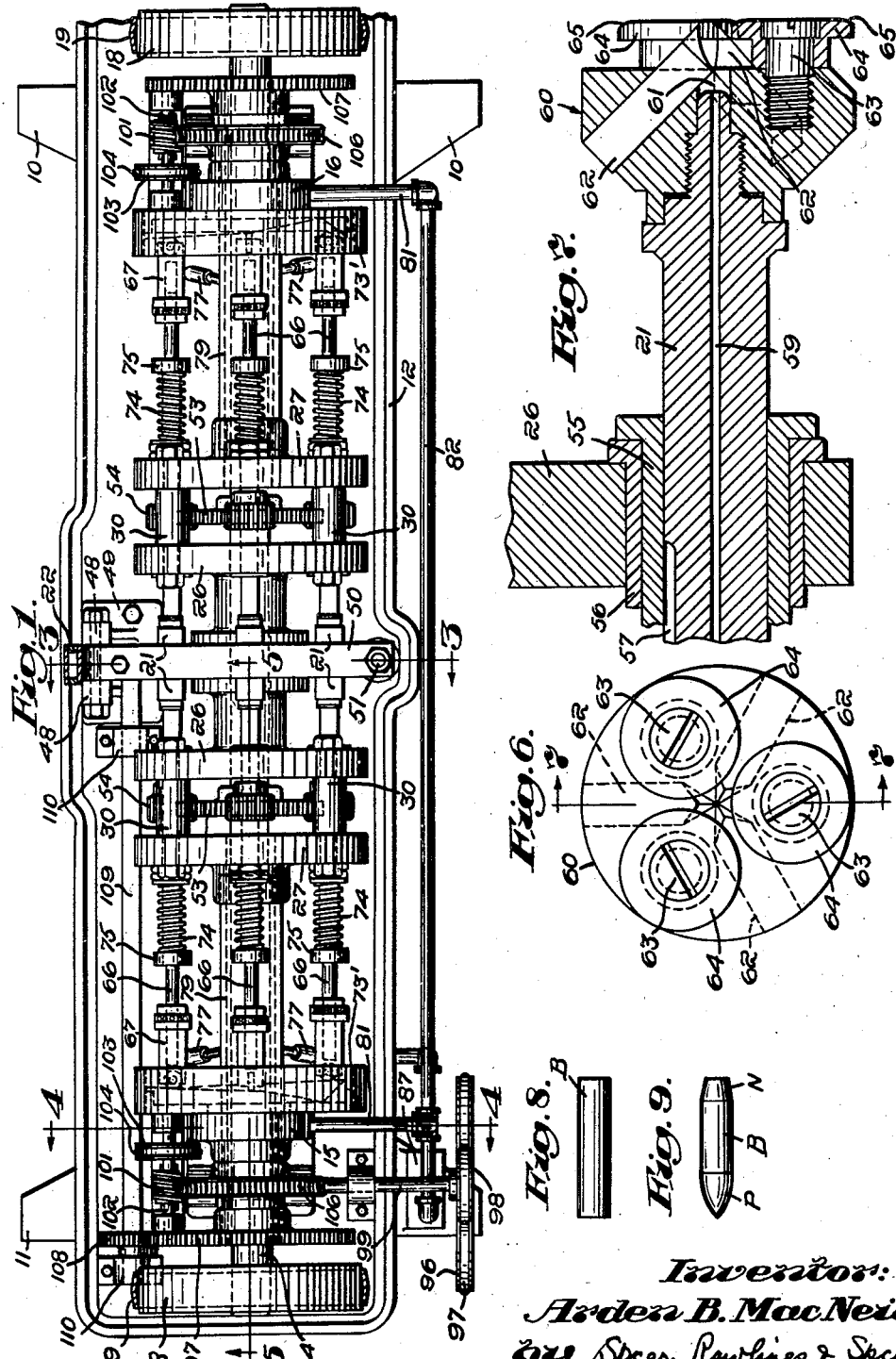
Inventor:
Arden B. MacNeill,
by Spear, Rawlings & Spear.
Attorneys

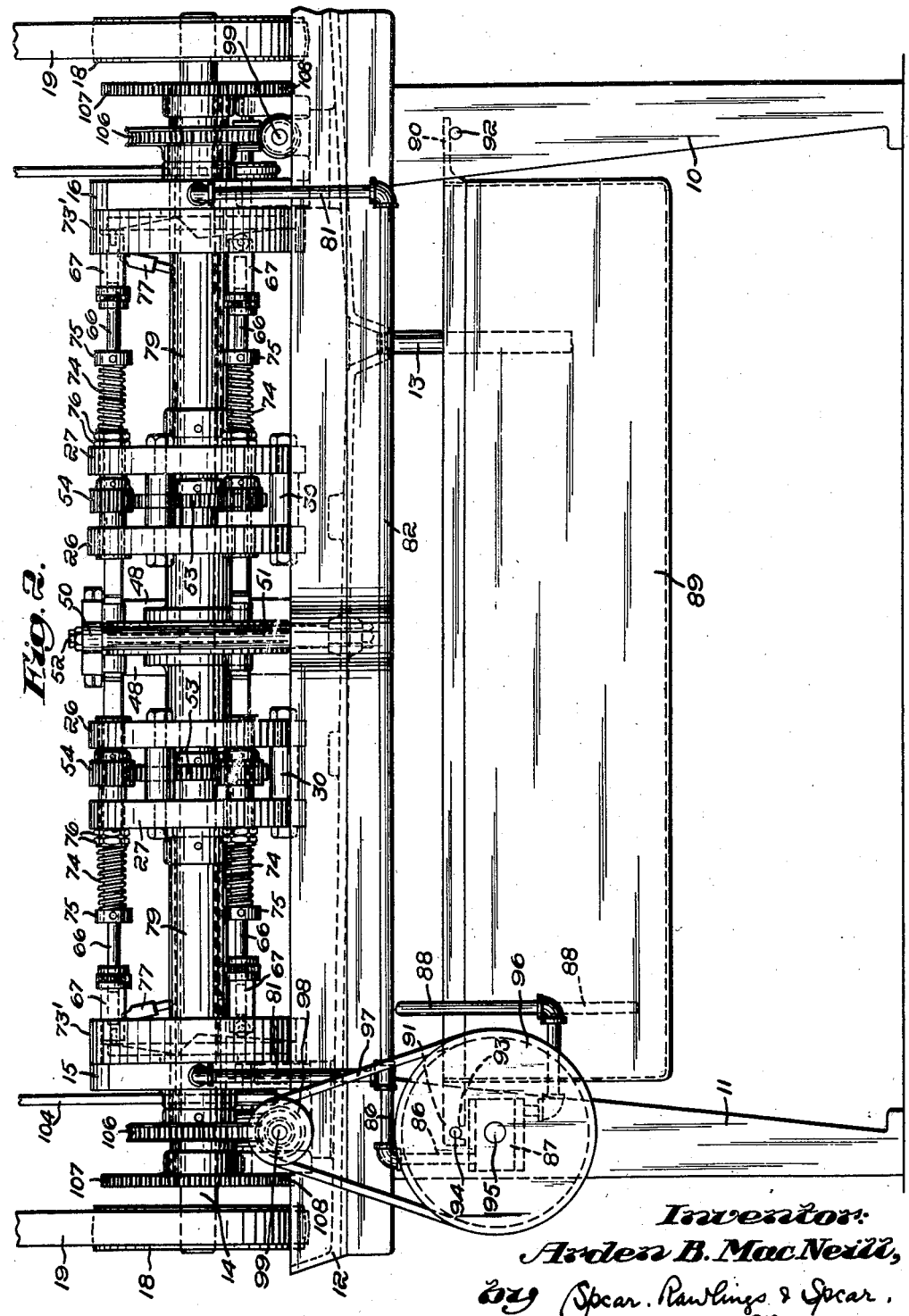

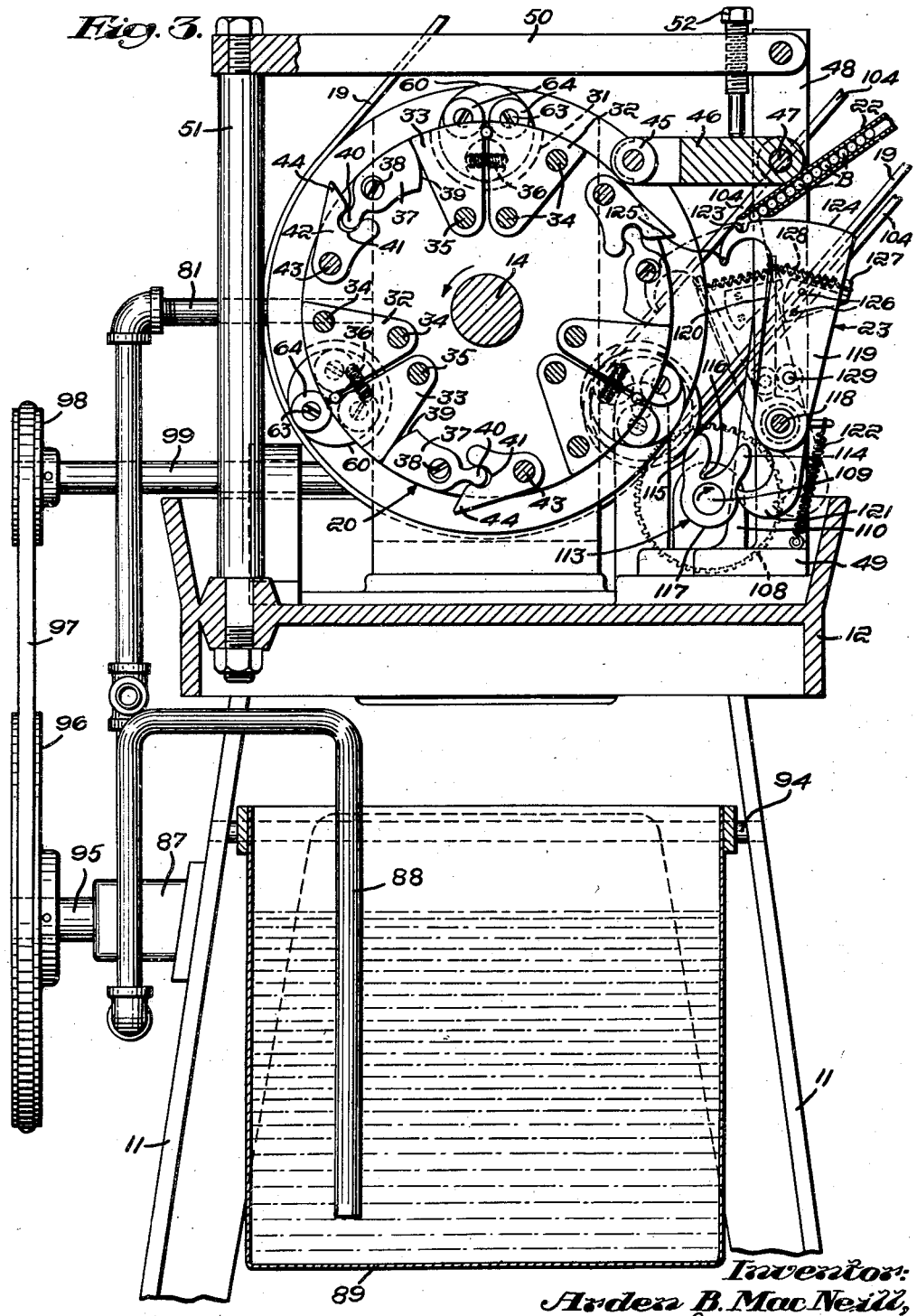

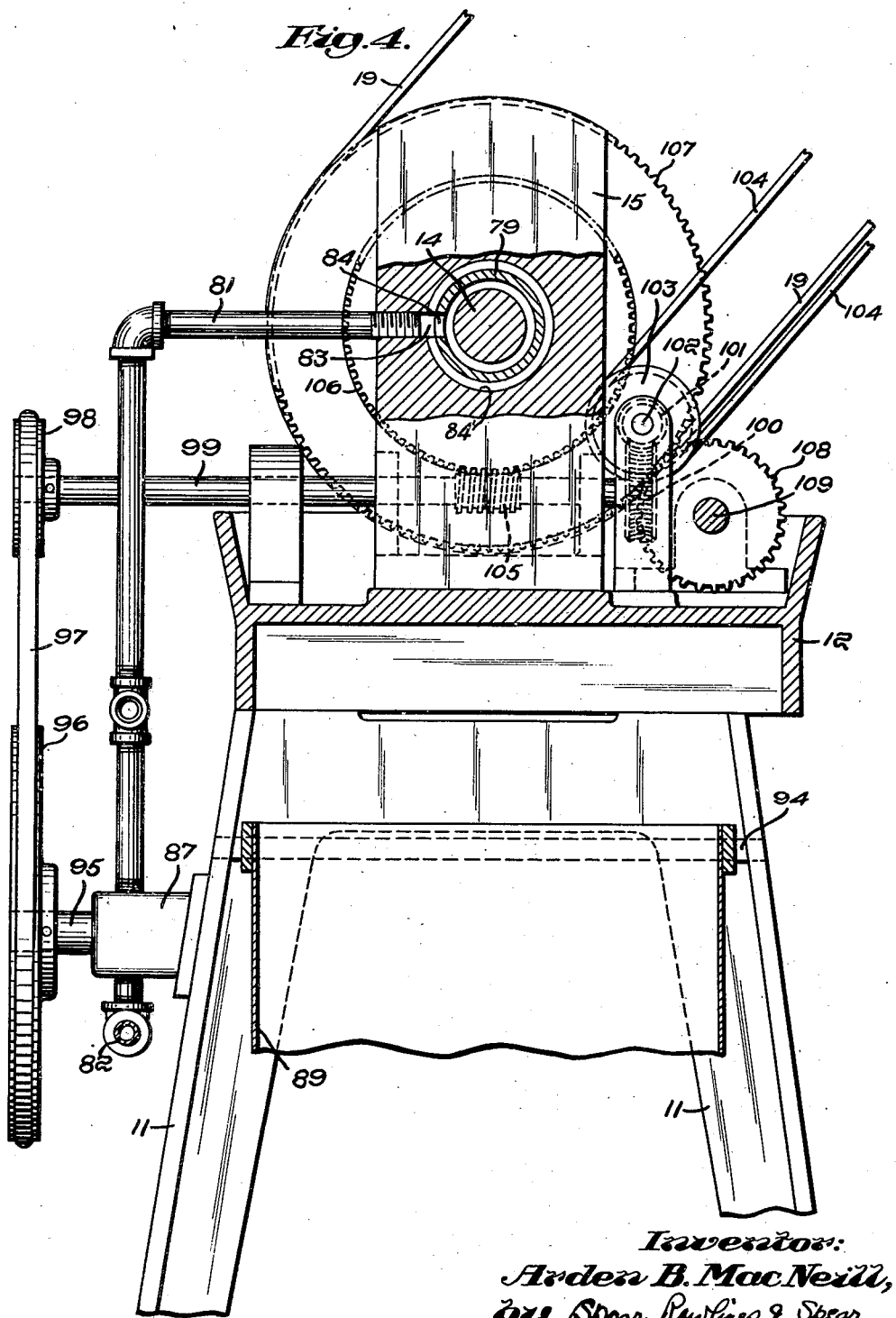

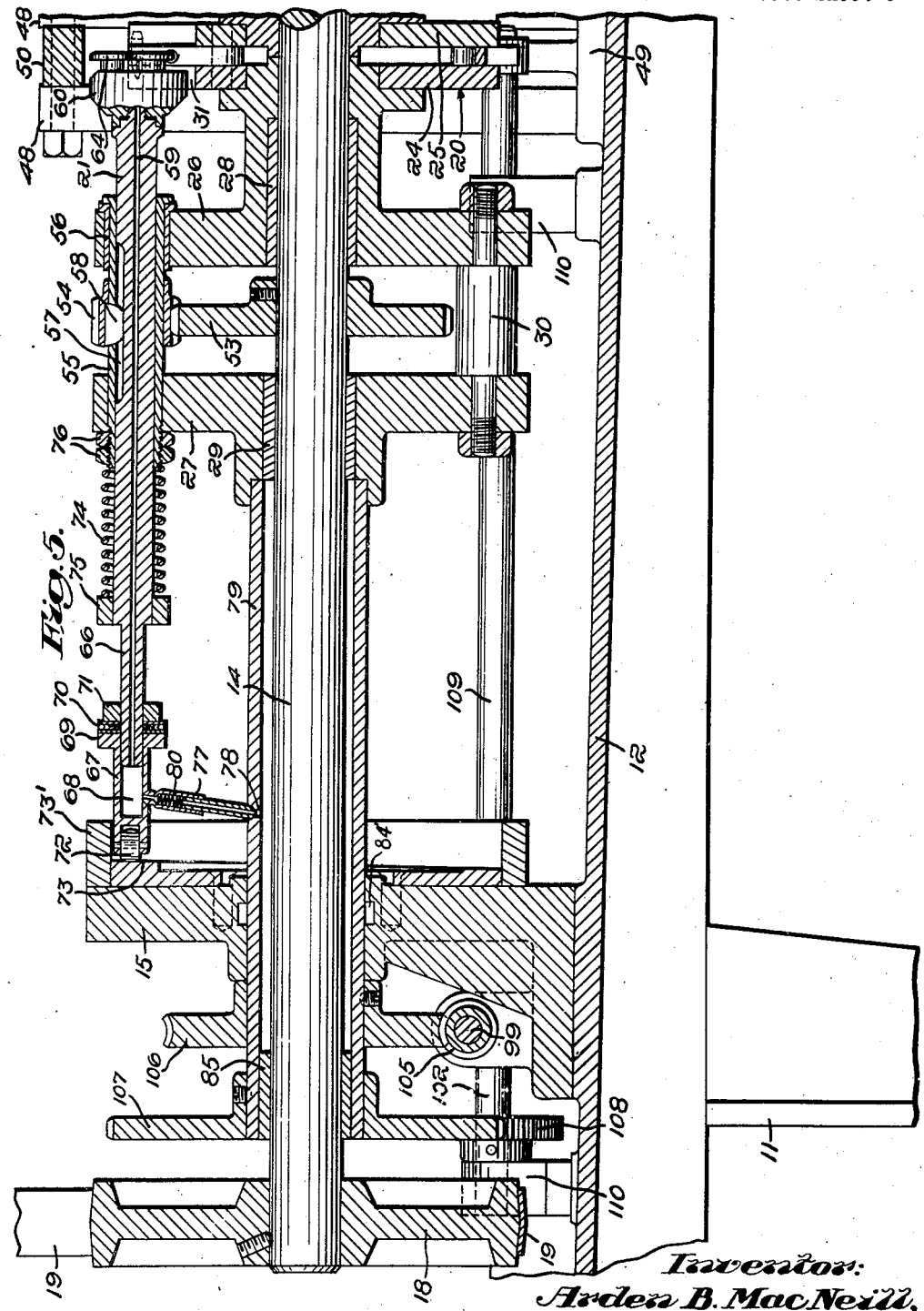

June 26, 1945.     A. B. MacNEILL     2,379,242
HIGH SPEED ROTARY CUTTING MACHINE
Filed Dec. 17, 1942     6 Sheets-Sheet 6
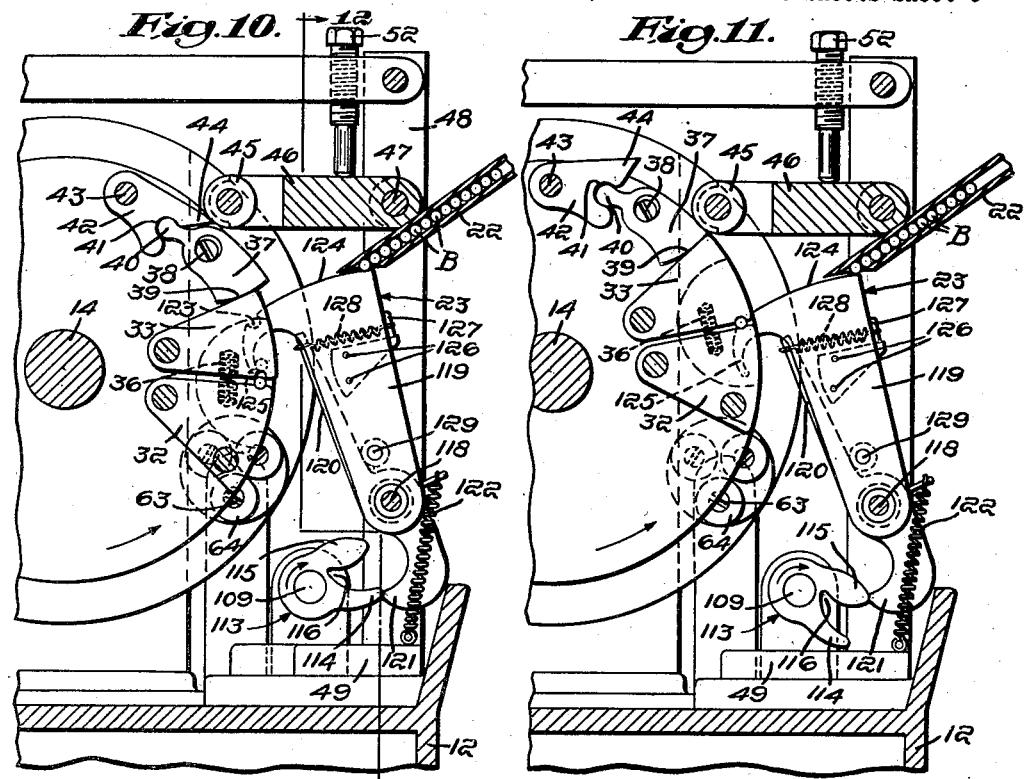
Inventor:
Arden B. MacNeill,
by Spear, Rawlings & Spear.
Attorneys Patented June 26, 1945

2,379,242

UNITED STATES PATENT OFFICE 2,379,242

HIGH SPEED ROTARY CUTTING MACHINE

Arden B. MacNeill, Waltham, Mass., assignor, by mesne assignments, to Harris Harold MacNeill and Arden B. MacNeill, Waltham, Mass., as joint tenants Application December 17, 1942, Serial No. 469,379

16 Claims. (Cl. 82—2)

This invention relates to improvements in high speed cutting machines for finishing metal or other cores or blanks.

Such cores or blanks may be of any desired size and shape and may be finished on one or both ends, depending upon the nature of the final articles to be made therefrom.

For the purposes of this application, I shall discuss my invention in its relation to the mass production of bullet blanks or cores for use in cartridges. It will be understood, however, that such discussion is illustrative and not limiting, and that the principles of my invention are applicable to the mass production of a wide variety of articles, typical examples of which are rivets, studs, fittings and other small machine or instruments parts, whether finished on one or both ends.

Considering the production of bullet cores, however, as characteristic of the general problems met in producing any desired blank or core on a real mass production basis, it is customary to cut a point on one end and a neck on the other end of a bullet core.

Heretofore, bullet cores have usually been made on automatic screw machines. The productive capacity of the screw machine is necessarily limited, however, by its basic design. Among the factors which make for slow-speed production are the following: The screw machine operates with a step-by-step motion and consequently production time is lost while the machine is indexing. The stock is in the form of rods of considerable length from which the cores or blanks are successively cut off. In this cutting-off operation it is necessary, because of the thin grind on the cut-off tool, to slow down the feed rather than risk tool breakage and consequent breakdown of the machine.

Other disadvantages of the screw machine are that the long rods of revolving stock require considerable floor space in proportion to the productive capacity of the machine; whenever the cutting tools require adjustment, the machine must be stopped with consequent loss of productive capacity; and in making bullet cores, it has been found difficult, if not impossible, to properly finish both ends of the core simultaneously in the machine, due to the circumstances that in the cutting-off step a small sharp point is usually left where the rod stock was cut off, which point, if too pronounced, must be removed by an after-operation.

The broad object of my invention is to provide a machine which will avoid these and other objections of the screw machine and will product well-finished bullets or other cores or blanks on a real mass production basis comparable to the productive capacity of a punch press.

Other objects and advantages will appear as the description proceeds.

The design of my machine stresses simplicity, both in respect to construction, operation and maintenance. My machine is inexpensive to build and operate, requiring no complex machining jobs nor expensive castings. It is small in size and light in weight but nevertheless for its size and cost, will produce more, and better finished, bullet or like cores than any other known machine.

Among the reasons why the productive capacity of my machine is so high are the following: My machine is designed to rotate continuously at high speed; making a continuous cut on the work from start to finish; it handles precut cores or blanks; and it feeds, cuts and ejects such cores or blanks automatically and with the minimum possibility of error or failure.

When constructed to simultaneously finish both ends of a bullet or other core or blank, my machine comprises a longitudinally extending continuously-rotating main shaft, and an independently driven sleeve and spindle-holder assembly rotating slowly around said main shaft as an axis in a planetary manner.

Centrally located on the machine is a chute down which the pre-cut cores or blanks feed by gravity from a suitable hopper. The cores or blanks are pre-cut from suitable stock to the proper length, say approximately 1.125" for a bullet core, in any suitable die-press, and may be supplied by hand or otherwise to the hopper from which they feed by gravity singly down the chute.

Mounted adjacent the discharge end of the chute is a combined feeder and ejector operating in timed relationship to a centrally located chuck fast on the assembly and to a set of spaced axially alined revolving and rotating cutter spindles fast on the sleeve assembly at either side of said chuck.

The periphery of the chuck is provided with one or more sets of work-holding jaws, depending upon the number of spindles, and means are provided for successively opening and closing said jaws in time with the operation of the other working parts of the machine. Each blank is supported centrally within a jaw pair with both of its ends exposed to be acted upon by the cutters of a pair of opposed and alined cutter spindles.

The cutter spindles are independently rotated about their own axes at increased speed by gearing from the main shaft. The spindles are hollow and carry at their inner ends cutters of appropriate design. Stationary cams acting against the outer ends of opposed spindles slide the spindles longitudinally towards the chuck to bring their cutters into cutting contact with the ends of a blank clamped within the chuck. Suitable compression springs are provided for returning the spindles after they have been carried through a sufficient portion of their orbit to complete the cut.

The action of the combined feeder and ejector is synchronized to the revolution of the chuck, and cutter spindles. It automatically supplies a core or blank from the lower end of the chute to each pair of work-holding jaws of the chuck each time when in the revolution of said chuck a jaw pair is automatically opened to receive the same.

In the continued revolution of the chuck said jaw pair is automatically locked closed and so remains while the core or blank clamped therein is carried around by the chuck and its ends are acted upon by the cutters of two opposed and alined inwardly pressing cutter spindles, and until automatically unlocked and opened at the completion of the cutting orbit of said spindle.

In the initial phase of their revolution, the outer ends of the cutter spindles first contact the stationary cams on the lower leads of said cams. As the spindles continue their revolution, they are progressively forced inwardly by said cams to bring their rapidly rotating cutters against the exposed ends of the blank and continue in such contact until the spindles shall have completed approximately 300° of their orbit or such other portion thereof as may be sufficient to complete the cut.

When the cut has been completed, the outer ends of the spindles come to the drop-off points of the stationary cams thereby permitting the spindles to be returned by their return springs. At approximately this time, the combined feeder and ejector automatically moves into position to eject the finished core from the jaw pair of the chuck when the jaw pair reaches the point in its orbit where it is automatically opened. When this occurs, the ejector withdraws the finished blank out of the opened jaw pair and in the continued revolution of the chuck inserts a new blank therein before the jaw pair reaches the point in its orbit where it is again automatically closed and locked.

This operation is continuous and at high speed. As many spindles may be built into the revolving unit as are desired. When more are added, the only change is an increase in the diameter of said unit and a change in the timing of the feeding and ejecting mechanism. The same feed and ejecting mechanism will serve all spindles, if timed accordingly.

Other important features of my machine include the following:

The cutters are tool bits which are form-ground so that they are interchangeable with each other. The cutter heads are removably mounted on the inner ends of the spindles and on each I rotatably mount three equi-distantly spaced beveled-edge rollers arranged radially about the axis of the cutter head. The working space between the beveled edges of the rollers is equal to the diameter of the bullet core so as to insure a cut concentric with the stock and eliminate any tendency of the cutters to chatter.

By having on hand a quantity of these tool holders, it is possible to sharpen the cutters and take a trial cut in a lathe with them to check their set-up, so that as the cutters become dull in use, it is only necessary to stop the machine briefly, detach the tool holders on each spindle and replace them with others which have been tried and checked. The machine may then be started again with the minimum loss of production time. This is a distinct advantage over the set-up of the ordinary screw machine, where the trial and actual settings must be done in the machine, with consequently greater loss of production time.

By making the cutter spindles hollow, it is possible to feed the cutting oil continuously to the work with maximum certainty. In my machine the oil is forced through the rapidly rotating spindles directly onto the cutters and the work. Moreover, centrifugal force throws all the chips clear of the work and the cutter, and the finished core is ejected at another point on the machine which is likewise free from chips.

Also, in my machine, the cuts on the ends of the bullet core are both taken simultaneously. Consequently one end of the core is finished as finely as the other and there is no loss of time, due to the necessity of eliminating the sharp point frequently left on the core in a screw machine during the step of cutting-off the core from the rod stock.

In the accompanying drawings I have illustrated a satisfactory embodiment of my invention especially designed for the high-speed production of bullet cores. In such drawings:

Fig. 1 is a plan view of a machine in accordance with my invention.

Fig. 2 is a front elevation thereof.

Fig. 3 is a section on the line 3—3, of Fig. 1, showing in full lines a neutral position of the combined feeder and ejector, and in dotted lines the feeding position thereof.

Fig. 4 is a section on the line 4—4, of Fig. 1.

Fig. 5 is a section on the line 5—5, of Fig. 1.

Fig. 6 is an end view of one of the cutter spindles particularly showing the cutters and their holders.

Fig. 7 is a fragmentary section on the line 7—7, of Fig. 6.

Fig. 8 is a side view of one of the cores or blanks before cutting.

Fig. 9 is a similar view of the finished product.

Fig. 10 is a fragmentary view showing the position of the combination feeder and ejector mechanism when the blank holding jaws are unlatched to permit removal of a finished blank. Fig. 11 is a similar view showing a new blank inserted by the combination feeder and ejector mechanism and the re-locking of the blank holding jaws on such new blank, and Fig. 12 shows the combination feeder and ejector mechanism as viewed along the lines 12—12 of Fig. 10.

In discussing the embodiment of my invention illustrated in the drawings, I will first give a general description of it before detailing the construction and operation of important parts thereof and their relation to each other.

General

The frame structure of my machine includes spaced pairs of end uprights 10 and 11 surmounted by a generally horizontal top or bed 12 which also functions as an oil pan and is preferably inclined to drain towards a down pipe 13.

Extending lengthwise of the machine frame is a main driving shaft 14 journaled adjacent its ends in castings 15, and 16, rising from bed 12. The shaft 14 is rotated continuously at high speed by any suitable direct drive. As here shown, each end of said shaft carries a pulley 18 over which belts 19 are trained and driven from a common power source, as an overhead shaft or the like (not shown). To some extent, the pulleys 18 act as fly-wheels to counterbalance the shaft and by providing a drive at each end of the shaft a smooth-running action is assured.

Mounted to rotate around shaft 14 as an axis in a planetary manner is an independently-driven sleeve and spindle holder assembly comprising sleeves 79 and pairs of spindle-holders 26 and 27. Sleeves 79 are directly driven from worm shafts 99 (see Figs. 2 and 5) in a manner to be later described, to rotate at slow speed, as compared with the rotation of shaft 14.

Mounted on each spindle holder 26 to revolve therewith is a work-holding chuck 20, and mounted in each pair of spindle holders 26—27 to revolve therewith is at least one cutter spindle 21 disposed parallel to the shaft 14.

Where the cores or blanks B are to be finished on both ends, the chuck is located substantially mid-way of the length of the machine and its periphery is provided with at least one work-holding pocket in the form of a pair of clamping jaws. In such case, also, there is at least one cutter spindle at either side of the chuck, the spindles being alined with each other and being spaced apart at their inner or cutter-carrying ends by the chuck.

In the interests of high production, the chuck is provided with a plurality of, here shown as three, pairs of clamping jaws equidistantly spaced about its periphery, and at either side of the chuck there are a corresponding number of axially alined radially spaced cutter spindles.

The blanks are held within the pairs of jaws with their axes parallel to the axis of rotation of shaft 14 and their ends exposed at either side of the chuck adjacent the periphery thereof for cutting contact by the cutters of the spindles.

Where only one end of the core or blank B is to be finished, the spindle, or set of spindles, at one side of the chuck may be omitted.

In either case, the cores or blanks B of the proper diameter, and pre-cut to the proper length in any suitable die-press or the like, are placed by hand or otherwise in a hopper (not shown) down which they feed singly by gravity to a magazine or feed chute 22.

The delivery end of chute 22 is disposed outside of but adjacent to the orbit of the blank-receiving jaws, and the blanks are successively placed in the pocket or pockets of said chuck by means of a combined feeder and ejector 23. The member 23 is pivoted on the machine superstructure to swing through an arc between the lower end of said chute and the point in the revolution of the chuck at which the blank-receiving jaws are successively opened, and functions during the time that each pocket is open first to eject the finished blank from such pocket and thereafter to insert a new blank therein.

In addition to their planetary revolution with the spindle holders about the main shaft as an axis, the cutter spindles are rotated about their own axes at increased speed from said main shaft, and are also reciprocated axially towards and away from the chuck, being slid inwardly towards and their cutters maintained in cutting contact with the blanks for approximately 300° of their orbital travel, or such other portions thereof as may be sufficient to complete the cut.

Cutting oil is continuously supplied through the cutter spindles, which are hollow, to the cutters by means of a continuously running pump.

In achieving these various motions in properly timed relationship to each other, I prefer to construct and operate the various parts as shown and described.

Chuck assembly

The chuck 20 comprises a pair of suitably spaced parallel plates 24 and 25 (see Fig. 5) revolving with the sleeves 79 by virtue of being made fast each to the inner members 26 of two pairs of spaced inner and outer spindle holders 26 and 27 within which shaft 14 is bushed as at 28 and 29 adjacent the center of the machine. The pairs of spindle holders are tied together by tie rods 30 and are fast on the sleeves 79.

The peripheries of the chuck plates 24 and 25 are provided with equidistantly spaced work holding pockets, being peripherally cut away as at 31 adjacent said pockets to clear the heads of the cutters (see Fig. 3). The pockets are preferably in the form of pairs of clamping jaws mounted within the space between said plates. As shown in Fig. 3, each jaw pair comprises a stationary jaw 32 and a movable jaw 33. Jaw 32 is pinned between the chuck plates as at 34. Jaw 33 is pivoted between said plates as at 35. Between the opposing edges of each jaw pair is a compression spring 36 normally acting to push said jaws apart.

Associated with the movable jaw 33 of each jaw pair is an adjustable cam 37. Each cam 37 is mounted on an eccentric pin 38 extending through the chuck plates and has that end thereof adjacent jaw 33 formed as a cam surface 39 which normally engages said jaw and forces it towards stationary jaw 32 against the action of spring 36 to thereby maintain the jaws closed. The opposite end of each cam 37 is reduced to provide a locking projection 40 which is normally received in a locking recess 41 provided by the forked end of a locking latch 42 pivoted as at 43 between the chuck plates. The outer arm 44 of each latch 42 is extended to normally project slightly beyond the periphery of the chuck plates for actuation in the proper point of the orbit of the chuck by an unlocking roll 45 disposed adjacent the path of travel of said arms 44. As each latch 42 is unlocked by the unlocking roll 45, its cam 37 is moved by said latch to permit the jaws to be opened by the action of the spring 36, and the cam 37 is then positioned, as shown in Fig. 10, so that its trailing end projects slightly beyond the periphery of the chuck plates to be actuated by the roll 45 to re-lock the jaws in the continued rotation of the chuck assembly, as shown in Fig. 11. While the jaws are unlocked, the combination feeder and ejector mechanism 23 removes a finished blank and replaces it with a new blank from the hopper feed 22.

Roll 45 is mounted on the inner end of an arm 46 which is pivoted at 47 between a pair of spaced uprights 48 rising from either side of a bracket 49 at the rear center of the machine (see Figs. 1 and 3). Fastened to the upper ends of uprights 48 is a cross-member 50 which extends forwardly over the chuck to the front side of the machine and is there supported by an upright 51. The roll-carrying arm 46 is adjusted relative to the projecting arms 44 of latches 42 by means of a screw 52 adjustable vertically through the cross-member 50.

Cutter spindle assembly

Each set of cutter spindles 21 is carried by the discs 26 and 27 to revolve with sleeves 79. The spindles of each set are likewise rotated about their own axes at increased speed from main shaft 14 by means of gears 53 fast on said shaft between each disc pair (see Fig. 5). Gears 53 mesh with pinions 54 on sleeves 55 which are bushed as at 56 on the inner discs 26. The spindles 21 slide axially within said sleeves for a distance represented by the keyway 57 in the spindle 21 in Fig. 5 within which keyway projects key 58 of sleeve 55.

The spindles 21 have axial oil ducts 59 extending from end to end thereof and at their inner ends are reduced and threaded as best shown in Fig. 7, to receive the removable cutter heads 60. Each head is diagonally bored at a plurality of (here shown as three) equi-distantly spaced points to receive the cutters 62. The converging ends of the cutters intersect a hole 61 (see Fig. 7) and the cutters themselves are removably retained within the cutter head by any suitable set screws or their equivalents (not shown).

I rotatably mount, by suitable removable fastening means 63 to the inner face of each cutter head 60, a plurality of (here shown as three) equi-distantly spaced rollers 64 having beveled working edges 65. The working space between the edges 65 of each set of rollers substantially equals the diameter of the blank B, and as appears in Fig. 6, said edges are disposed relative to the converging ends of the cutters in such a manner as to insure maximum cutting efficiency while, however, permitting the chips to be expelled by centrifugal force free of the work.

All spindles of both spindle sets revolve and rotate in the same direction, but the cutters of one set of spindles are all positioned for a right hand cut and those of the opposed spindle set are all positioned for a left hand cut.

The outer ends of the spindles are reduced as at 66 to slide within hollow bearings 67 having chambers 68 to communicate with the outer ends of the oil ducts 59 of said spindles. Each bearing is flanged at its inner end as at 69 to react against a thrust bearing 70 interposed between it and a collar 71 fixed on the reduced portion 66 of the spindle. At its outer end each bearing is forked to receive a roller 72 which rides along a stationary cam 73 fixed to the end castings 15 and 16 at either end of the machine.

Cams 73 progressively slide the spindles inwardly to bring their cutters in cutting contact with the exposed ends of a blank held within each of the pair of work holding jaws and to maintain such contact for a very substantial part, usually approximately 300°, of the orbit of the spindles and the blank receiving jaws. Preferably, I surround each cam 73 with a cylindrical ring 73' to prevent the rolls 72 from completely riding off the cams.

When the rolls 72 pass off the low parts of the cams 73 the spindles are returned to their original position by compression springs 74. These are coiled about the spindles 21 between collars 75 fixed thereon and lock nuts 76 threaded on sleeves 55 and abutting the outer discs 27.

Oil circulating system

Cutting oil is continuously pumped to the oil chambers 68 of bearings 67 through telescopic hollow connections 77, the outer members of which open into said chambers. The inner members of connections 77 open into oil passage 78 formed by sleeves 79 surrounding and spaced from main shaft 14 at each end of the machine. Springs 80 are interposed between the inner and outer telescopic members to insure proper functioning thereof.

Oil passages 78 are supplied by a pipe system comprising pipes 81 at each end of the machine connected to each other by pipe 82. The delivery ends of pipes 81 extend into holes 83 in the castings 15 and 16 within which the outer ends of sleeves 79 are journaled. The castings each have an annular groove 84' into which the holes 83 open, and the sleeves themselves have inlet openings 84 (see Fig. 4) to permit the oil to flow to the oil chamber 68 by way of the thus established conduits.

The inner ends of sleeves 79 are journaled in the outer discs 27. The outer ends of each oil passage 78 about each sleeve is closed by bushings 85 and the inner ends of said passages are closed by the bushings 29. Bushings 85 and 29 thus perform the double function of sealing such ends and of furnishing bushings for the sleeves in the parts 15 and 16.

Oil to the pipe system 81–82 is supplied by a feed pipe 86 from the delivery side of a continuously running pump 87 mounted between the end uprights 11 at the left hand end of the machine frame (see Fig. 2). The pump 87 is supplied by an inlet pipe 88 from an oil reservoir 89 removably hung beneath the oil pan 12. The down pipe 13 returns oil by gravity into said reservoir from said pan. The top marginal edge of reservoir 89 is extended at its ends as at 90–91. The extension 90 rests on a cross pin 92 between legs 10 at the right hand end of the machine and the extension 91 is notched as at 93 to provide a hook to hook over a cross pin 94 between legs 11 at the left hand end of the machine.

The oil pump 87 as shown in Fig. 2 is driven continuously in any suitable manner, as by mounting on the shaft 95 thereof a pulley 96 over which a belt 97 is trained. The belt 97 is driven by a pulley 98 on the front end of a worm shaft 99 extending transversely of the machine above the oil pan at the left hand end of the machine. There is a second worm shaft at the right hand end of the machine (see Fig. 2). Each worm shaft 99 is provided at its rear end with a worm gear 100 meshing with a worm gear 101 on a continuously driven stub shaft 102 extending longitudinally of the machine at the left hand end thereof.

Drive for sleeves 79 and ejector 23

Each stub shaft 102 carries a pulley 103 driven by a belt 104 from any suitable power source (not shown). Stub shafts 102 drive sleeves 79 through worm 105 on worm shafts 99 meshing with gears 106 on sleeves 79. The left hand sleeve 79 carries a gear 107 in mesh with pinion gear 108 on timing cam shaft 109 to synchronize the operation of feeder 23 to the other parts of the machine.

The timing shaft 109 is journaled longitudinally of the machine in suitable bearings 110 near the rear thereof (see Fig. 1) and because there is only a single feeder this shaft needs to extend only to substantially the center of the machine. Where as shown, each spindle set consists of three spindles, shaft 109 makes three revolutions to each revolution of the sleeves 79.

Fast on shaft 109 adjacent its inner end is a cam 113 having spaced lobes 114 and 115 forming an arcuate recess 116 and having an outer surface 117 below said lobes and concentric with said shaft (see Fig. 3).

The combination feeder and ejector 23 is pivoted at 118 between upright arms 48 above and to one side of shaft 109. It is sectional in construction, comprising two outer side plates 119 and an inner center plate 120, all of which pivot about pivot 118.

The inner plate 120 has a pendent arcuate-shaped cam engaging lower portion 121 to fit within the arcuate recess 116 of cam 113 and to be actuated by the lobes 114 and 115 at the proper time. Normally the portion 121 engages the outer surface 117 of the cam during that part of the cam's rotation which is idle movement, being urged into engagement therewith by coil spring 122 which is anchored at its ends to pivot 118 and bracket 49, respectively.

The upper ends of the outer plates 119 are positioned beneath the discharge end of the chute 22. They are formed with a blank-feeding recess 123 in their outer edges and said edges are arcuately curved as indicated at 124 and terminate in a hook portion 125 shaped to reach in and pull out the finished blanks from the chuck pockets when said pockets successively open as they approach said hook in their revolving travel.

Pinned at 126 between the plates 119 is a block 127 spring-tensioned as at 128. The spring 128 is anchored at one end to a lug on the block 127 and at its other end to the upper end of the inner plate 120. This construction provides a resilient connection between the plates 119 and 120 when the end 121 of plate 120 is cam actuated. A stop pin 129 provides means for positively connecting plates 119 and 120 when the spring 122 is free to pivot the combination feeder and ejector mechanism towards its full line position of Fig. 3. (See also Figs. 10 and 11.)

The arcuately curved upper edges of the outer plates 119 act as a stop to prevent blanks from chute 22 feeding therealong into recess 123 until the cam 113 has been rotated a distance sufficient to bring recess 116 into engagement with the pendent end 121 of the inner plate 120, at which time said recess being slightly deeper than the outer idle surface portion 117 of cam 113, will permit member 23 to swing outwardly far enough to bring the blank-feeding recess 123 directly under the lower end of chute 22 so that the bottommost blank in said chute can roll by gravity directly into said recess.

While the blank is gripped in a jaw pair of the revolving chuck and being acted upon by the cutters, the cam surface 39 of cam 37 for such jaw pair bears against the adjacent movable jaw to keep the jaws closed. When in the continued revolution of the chuck, the projecting arm 44 of the latch 42 strikes roller 45, the latch is rocked about its eccentric pin 38 as a pivot far enough to disengage its recess 41 from the ear 40 of the cam 37 so that the spring 36 can force the jaws open (see Figs. 3 and 10).

At substantially this moment, the hooked portion 125 of the combined feeder and ejector 23 swings inwardly from its position shown in Fig. 3 as the cam engaging portion 121 is actuated by the lobe 114 to position the hooked portion 125 in the path of the finished blank. The hook 125 withdraws the finished blank from the now open jaws as the portion 121 enters the recess 116 to effect the picking-up of a new blank and swings in again as the cam engaging portion 121 is actuated by the lobe 115 as shown in Fig. 11 with a new blank now lodged in the feeding recess 123 to deposit it in correct position between the jaws before they are again closed by the action of the roller 45 on the member 37. As shown in Fig. 11, a new blank, carried in the recess 123 is supported by the plates 119 in a position to be picked up by and clamped between the jaws as the chuck continues its rotation.

The finished blanks may drop directly into any suitable collection receptacle (not shown).

Conclusion

From the foregoing, it will be apparent that I have provided simple and efficient means for shaping blanks. The chuck and spindle carrying assembly revolves continuously and the spindles are continuously rotated by the main shaft at a relatively high rate of speed. As the chuck revolves, each pair of jaws is open through that part of its orbit required for the ejection of a shaped blank and the picking-up of a new blank, while it remains closed during the remainder of its orbit to permit the cutters carried by the spindles to shape the end or ends of the blanks accurately.

While a pair of jaws is open, the cutter spindles or spindles axially alined with the pocket defined thereby are in an inoperative position but when the jaws are closed, the spindles are carried towards the chuck to bring the cutters against the work.

While I have described and illustrated a preferred embodiment of my invention which is especially suitable for the high speed production of bullet cores which require finishing on both ends, I recognize that various changes in the design of my machine may be made according to the nature and uses of the particular article to be produced. For example, one spindle set may obviously be omitted, or disconnected, if blanks are being fed which require finishing on one end only.

The chuck assembly may likewise be modified as circumstances require, as for example, by substituting other types of locking and unlocking devices for the chuck jaws.

Similarly, modifications may be made in the blank feeding and ejecting means which has been shown as a single member which both feeds and ejects. Obviously, however, under some circumstances, it might be desirable to provide separate feeders and ejectors.

These, and all such other modifications in structural detail and arrangement are therefore to be considered within the spirit and scope of my invention if within the limits of the appended claims.

What I therefore claim and desire to secure by Letters Patent is:

1. A cutting machine to support a blank and to shape at least one end thereof, said machine comprising a main shaft, a sleeve mounted on said shaft for rotation independently thereof, normally closed blank holding means rotating with said sleeve to so hold a blank that the axis through the end thereof to be shaped is parallel to said shaft, a drive for said shaft, a drive for said sleeve, cutting means carried by said sleeve for rotation independently thereof and in axial alinement with a blank held by said holding means, means driven by said shaft to rotate said cutting means, said cutting means being axially movable towards and away from said holding means, means to open said blank holding means during a portion of its orbital travel, timed means pivoted to swing through a path at substantially right angles to the axis of said shaft to withdraw a shaped blank therefrom and to place a new blank therein while said holding means are open, and means to move said cutting means into and out of an inoperative position, said opening means and said timed means operating when said cutting means is inoperatively positioned and coacting with said blank holding means to effect feed and discharge of the blanks along said angular path.

2. The machine of claim 1 in which the blank holding means comprises a support, a jaw fixed on said support, a jaw pivotally connected to the support, a spring urging said jaws apart, and means to lock said jaws in blank holding position but disposed for engagement with the opening means.

3. The machine of claim 1 in which the blank holding means comprises a support, a pair of blank holding jaws, one of which is fixed on the support and the other of which is pivotally carried thereby, a spring normally urging the jaws apart, a cam pivotally carried by the support to engage with the pivoted jaw to move it into blank holding position, a latch pivotally carried by the support to lock the cam when engaged and operated by the opening means.

4. A cutting machine to support a blank and to shape at least one end thereof, said machine comprising a continuously revolving main shaft, an independently revolving sleeve and spindle-holder assembly rotating slowly around said shaft as an axis, a chuck fixed on said assembly and provided at its periphery with at least one pair of jaws to so hold a blank that the axis of the blank through the end thereof which is to be shaped is parallel to said shaft, a blank chute having its discharge end disposed adjacent to but outside of the orbit of said chuck jaws, a blank-feeder operating adjacent the discharge end of said chute, means for locking said chuck jaws closed upon a blank entered therebetween and for maintaining said jaws closed during a substantial portion of the orbit of said jaws, a cutter spindle carried by said assembly parallel to said main shaft to revolve in a planetary manner about said shaft and axially alined with a blank clamped within said jaws, a cutter mounted on the end of said spindle which is adjacent said chuck, means for rotating said spindle at increased speed about its own axis, means continuously effective during a substantial portion of the spindle orbit for sliding said spindle axially towards said chuck to thereby bring the cutter into cutting contact with the end of the blank which is to be shaped, return means effective during the remaining portion of the spindle orbit for restoring the spindle to original position, means for unlocking and opening the chuck jaws during a portion of the remainder of the orbit of said jaws, means for ejecting a finished blank while said jaws are open, and means for actuating said blank feeder in time with the opening of the chuck jaws and the ejection of the finished blank to place a new blank within said jaws.

5. The machine of claim 4, the chuck being provided with a plurality of equidistantly spaced sets of jaws and there being a plurality of correspondingly spaced cutter spindles and cutters for said sets of jaws.

6. The machine of claim 4, the chuck being provided with a plurality of equidistantly spaced sets of jaws and there being at either side of said chuck a set of correspondingly spaced cutter spindles and cutters for said sets of jaws.

7. A cutting machine to support a blank and to shape at least one end thereof, a shaft, an assembly comprising a pair of holders mounted on said shaft for rotation independently thereof and interconnected at a point remote therefrom, a sleeve carried by one of said holders, normally closed blank holding means carried by the other of said holders to so hold a blank that the axis through the end thereof to be shaped is parallel to said shaft, a support on said machine for said sleeve, a spindle slidably suported by said pair of holders for rotation independently thereof and in axial alinement with a blank held by said holding means, a gear on said spindle intermediate said pair of holders, a gear on said shaft intermediate said pair of holders and in mesh with said spindle gear thereby to rotate said spindle at a desired speed, a cutting element on the end of said spindle adjacent the blank holding means, a collar adjacent the other end of said spindle, a spring intermediate said collar and the adjacent holder to urge said spindle away from said blank holding means, a cam on said support engageable by the end of said spindle operative to move said spindle towards said work holding means to be in an operative position during a substantial part of its orbital travel, means to open said blank holding means, and means movable into and out of the path of said blank holding means to withdraw a shaped blank and to place a new blank therein while said blank holding means are open, both of said last named means being operative when said spindle is in an inoperative position.

8. A cutting machine to support a blank and to shape at least one end thereof, said machine comprising a main shaft, a sleeve mounted on said shaft for rotation independently thereof, normally closed blank holding means rotating with said sleeve to so hold a blank that the axis through the end thereof to be shaped is parallel to said shaft, a drive for said shaft, a drive for said sleeve, cutting means carried by said sleeve for rotation independently thereof and in axial alinement with a blank held by said holding means, means driven by said shaft to rotate said cutting means, said cutting means being axially movable towards and away from said holding means, means to open said blank holding means during a portion of its orbital travel, a source of blanks having a discharge adjacent to but outside the orbit of said blank holding means, a cam driven by said sleeve drive, timed means adjacent to but outside the orbit of a blank in said holding means and actuated by said cam to intercept said orbit to withdraw a shaped blank therefrom and to pick up a new blank from the discharge and to place it in said holding means when said holding means are open, and means to move said cutting means into and out of an inoperative position, said opening means and said cam actuated means operating when said cutting means is inoperatively positioned.

9. The machine of claim 8 in which the cam actuated means comprises a member pivotally supported by the machine and in engagement with the cam, the member being normally effective to block the blank discharge but having a blank receiving pocket, and the cam has at least two operative portions, one of which is effective to position the member so that the pocket receives a blank and the other of which is effective to position the member to bring the blank into the blank holding means.

10. The machine of claim 8 in which the cam actuated means comprises a member having a blank receiving pocket and including a blank withdrawing hook, means pivotally supporting the member on the machine in engagement with the cam and in a position to block the blank discharge, a spring normally holding the member in blocking position, and the cam has three operative portions, one of which is effective to bring the hook into the orbit of the blank holding means, the second of which is effective to pivot the member so that the hook withdraws a shaped blank and the pocket is positioned to receive a new blank from the blank discharge and the third of which is effective to position the member to bring the new blank into the blank holding means.

11. A cutting machine to support a blank and to shape at least one end thereof, said machine comprising a main shaft, a drive for said shaft, a sleeve mounted on said shaft for rotation independently thereof, normally closed blank holding means rotating with said sleeve to so hold a blank that the axis through the end thereof to be shaped is parallel to said shaft, said blank holding means comprising an unlocking member and a locking member, said members coacting so that said members alternatively have a position in which they protrude beyond a predetermined orbital path, cutting means carried by said sleeve for rotation independently thereof and in axial alinement with a blank held by said holding means, means to rotate said cutting means in desired relation to said drive shaft, said cutting means being axially movable towards and away from said holding means, means to move said cutting means into and out of an inoperative position, member engaging means in the path of the protruding member to open and close said blank holding means when said cutting means is inoperatively positioned, a shaft, a cam on said shaft, means actuated by said cam to withdraw a shaped blank from said open holding means, and to replace it with a new blank, a drive shaft to rotate said sleeve, and a gear connection between said sleeve and said cam shaft to rotate said cam shaft in desired relation to said sleeve.

12. In a cutting machine, a rotatable member having on its periphery a plurality of spaced work-holding units, each unit comprising first and second jaws one of which is movable so that said jaws have an open and a closed position, a spring normally urging said jaws into their open position, a cam pivoted to said rotatable member and normally effective to close said jaws against the action of said spring, a latch pivoted to said rotatable member and connected to said cam, a portion of said latch being exposed in a predetermined orbital path only when said jaws are locked, a portion of said cam being exposed in said orbital path only when said jaws are in their open position, and engageable means carried by said machine in said orbital path engageable successively by said portions when they protrude therein thereby first to actuate said latch to move said cam into a position wherein said spring is operative to open said jaws and thereafter in the continued rotation of said rotatable member to actuate said cam to close said jaws against said spring and to reset said latch.

13. The machine of claim 12, one end of said cam being reduced to provide a locking projection and the adjacent end of said latch being forked to provide a recess to receive said locking projection, one of the forks constituting the portion of the latch which is exposed for actuation by said engageable means.

14. The machine of claim 12, and a work feed chute and a combination feeder and ejector pivoted to said machine to swing between the discharge end of said chute and the rotatable member in a path substantially at right angles to the axis of rotation of said member, and means timed to the opening and closing of said jaws to swing said combination feeder and ejector through said angular path into positions wherein it first ejects a finished piece of work from said jaws while they are open and then inserts a new piece of work into the opened jaws.

15. A cutting machine, comprising a continuously revolving main shaft, a tool holder independently and continuously revolving about said shaft and carrying a plurality of independently rotatable tools, a work holder revolving with said tool holder and having a plurality of alternately lockable and unlockable work-holding units spaced about its periphery in alinement with said tools, means for rotating said tools about their own axes, means effective during the rotation of said tool holder about said shaft for sliding said tools axially towards and from the work-holding units of said work holder, means for locking each work-holding unit when its alined tool is in operative proximity thereto and for unlocking it when such tool is inoperatively positioned with respect thereto, a work supply source having a discharge outside of but adjacent to the orbit of said work-holding units, a combination work feeding and ejecting mechanism pivoted to the machine to swing between said work supply source and the work holder in a path which is substantially at right angles to the axis of rotation of said work holder, and means timed to the locking and unlocking of each work holding unit for actuating said mechanism first to eject a finished piece of work from the unlocked unit, then to place a new piece of work from said supply source therein, and then to block said supply source until a succeeding work-holding unit is unlocked.

16. In a cutting machine, a rotatable member, a plurality of spaced work-holding units on said member, each of said units comprising a pair of jaws and means operable to lock and unlock said jaws, means to actuate said locking and unlocking means as said member rotates, a work-feeding and ejecting mechanism pivotally supported by said machine to swing in a plane substantially at right angles to the axis of said member into and out of the path of said units to remove work from said jaws or to place new work therebetween when unlocked, and a cam to actuate said work-feeding and ejecting mechanism timed to the locking and unlocking of said units, said work-feeding and ejecting mechanism comprising a pair of plates and a lever between said plates, a spring normally holding said lever in an inoperative position, said lever being actuated by said cam against the action of said spring, means resiliently connecting said plates and said lever when said lever is actuated by said cam, and means positively connecting said lever and said plates when said lever is actuated by said spring.

ARDEN B. MacNEILL.